United States Patent
Okamoto et al.

(10) Patent No.: US 7,587,629 B2
(45) Date of Patent: Sep. 8, 2009

(54) DATA PROCESSING APPARATUS

(75) Inventors: Yuji Okamoto, Kyoto (JP); Naofumi Ueda, Kyoto (JP); Syoichiro Yoshiura, Nara (JP); Shunsuke Yajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 11/585,406

(22) Filed: Oct. 23, 2006

(65) Prior Publication Data
US 2007/0174677 A1 Jul. 26, 2007

(30) Foreign Application Priority Data
Nov. 21, 2005 (JP) ............................. 2005-336061

(51) Int. Cl.
*G06F 11/00* (2006.01)
(52) U.S. Cl. .......................................... 714/6
(58) Field of Classification Search ................. 714/2–4, 714/6–8, 13, 15, 25, 45, 47, 48, 57
See application file for complete search history.

(56) References Cited

U.S. PATENT DOCUMENTS

| | | | |
|---|---|---|---|
| 6,598,174 B1 * | 7/2003 | Parks et al. ..................... | 714/6 |
| 7,013,408 B2 * | 3/2006 | Knapp, III ..................... | 714/7 |
| 7,103,798 B2 * | 9/2006 | Morita ........................... | 714/6 |
| 2004/0128442 A1 * | 7/2004 | Hinshaw et al. ............. | 711/114 |
| 2005/0044454 A1 * | 2/2005 | Moshayedi ................... | 714/54 |
| 2005/0193238 A1 * | 9/2005 | Golasky et al. ............... | 714/6 |
| 2006/0075283 A1 * | 4/2006 | Hartung et al. ............... | 714/5 |

FOREIGN PATENT DOCUMENTS

| | | |
|---|---|---|
| JP | 04-178963 | 6/1992 |
| JP | 06-110618 | 4/1994 |
| JP | 08-190460 | 7/1996 |
| JP | 11-242569 | 9/1999 |
| JP | 2000-339106 | 12/2000 |

* cited by examiner

*Primary Examiner*—Nadeem Iqbal
(74) *Attorney, Agent, or Firm*—Edwards Angell Palmer & Dodge LLP; David G. Conlin; David A. Tucker (57) ABSTRACT

Data processing can be performed even if a trouble occurs in a hard disk device. If a trouble occurs in a first hard disk device, it is recognized that a spare hard disk device is on standby, and operation of the spare device is checked. The first hard disk device is switched with the spare hard disk device, the data is processed and output. During this process, the first hard disk device is initialized. When the first hard disk device becomes available, the spare hard disk device is switched with the first hard disk device. If the first hard disk device is unavailable, an error is notified to an administrator to request repair or replacement.

15 Claims, 5 Drawing Sheets

DATA PROCESSING APPARATUS

BACKGROUND OF THE INVENTION

1. Field of the Invention

The present invention relates to a data processing apparatus for processing input data according to purposes such as copy, printing, data communication and facsimile communication and for outputting the data.

2. Description of the Related Art

A data processing apparatus such as a multifunction machine provides features including a copier, a printer, a scanner and a facsimile. Data such as an input image or a character is processed according to a desired function and temporarily stored in a hard disk device as storage means. Then, the data is read from the hard disk device for printing on recording sheet as an image or for transmitting over a network or a telephone line. After the data is processed and output, it is erased from the hard disk device.

If a trouble occurs in the hard disk device, data cannot be stored or processed. To address this issue, two hard disk devices are typically used, one of them being for backup. For example, Japanese Patent Laid-Open No. 7-141262 describes that data is compressed in a spare hard disk device and stored with control signals.

However, the hard disk device of the above data processing apparatus stores data only for a time between the data processing and the outputting. That is, the data processing apparatus does not need to back up data. A substitute is needed not to suspend data processing, even if a trouble occurs in a hard disk device.

In the light of the above issues, the present invention aims to provide a data processing apparatus that can process data by using other storage means when a trouble occurs in storage means such as a hard disk device.

SUMMARY OF THE INVENTION

The present invention comprises: input means for inputting data; processing means for processing and outputting the input data; first storage means for storing data to process and output the input data; spare storage means for storing the data; and control means for controlling each means to process the input data, wherein the control means includes monitor means for monitoring the state of the first storage means and switches data storage location to the spare storage means depending on the state of the first storage means.

If a plurality of storage means are provided, the first storage means is used in normal conditions and the other storage means is used as the spare storage means being constantly available. The control means switches data storage location from the storage means to the spare storage means in the event of an emergency.

The monitor means judges whether a trouble has occurred in the first storage means or not. When a trouble occurs and the first storage means does not operate, the monitor means judges it is an emergency. At this time, the control means switches from the first storage means to the spare storage means. Accordingly, data is stored in the spare storage means instead of the first storage means and can be processed and output as normal. When the first storage means becomes available, the control means switches from the spare storage means to the first storage means.

The control means checks, before it switches, to see whether available spare storage means is present. It is necessary for the control means to check to see whether the spare storage means is present because the control means cannot switch if the spare storage means is not present. The control means also includes validation means for checking the operation of each storage means and performs the operation checking by the validation means when it switches. When switching to the spare storage means, data processing cannot be performed if the operation of the spare storage means is not secured. When the operation of the spare storage means is secured, the control means switches to the spare storage means. Similarly, when switching from the spare storage means to the first storage means, the operation checking for the first storage means is performed. In this way, since the operation of storage means which is used after the switching is secured, the storage means can be switched without any trouble and the data can be processed successfully.

The control means initializes the first storage means when the first storage means is switched with the spare storage means. Then, after initializing the first storage means, it switches from the spare storage means to the first storage means. In this way, a trouble might be solved by initializing the first storage means. If the operation of the first storage means is secured by checking the operation of the first storage means after the initialization, the control means switches to the first storage means. However, if a trouble in the first storage means cannot be solved by initialization or if the operation of the spare storage means is not secured, the first storage means needs to be repaired or replaced.

The first storage means stores data to be processed and output and management information for the data processing. The management information is also stored in the spare storage means. The stored data is erased after pre-determined processing and outputting. The management information is not erased but retained.

While the first storage means is in use, the control means causes the spare storage means to store the management information at the pre-determined timing or causes the spare storage means to store the latest management information when it overwrites the management information for the first storage means. In this way, each storage means shares the same management information and can smoothly process data, whichever storage means is used.

The control means stores data and management information in the spare storage means when the first storage means is switched with the spare storage means since the first storage means cannot be used. Then, the control means copies the management information stored in the spare storage means to the first storage means when it returns data storage location from the spare storage means to the first storage means. When the location is returned, the first storage means, in which nothing is stored, can get the management information by copying which was overwritten while the spare storage means was in use. Data stored in the spare storage means is not copied since it is to be erased.

The control means informs by display, voice and the like that the first storage means has been switched with the spare storage means and the spare storage means is in use. Therefore, a user can know that a trouble has occurred in the first storage means and then notify an administrator of the trouble. When the first storage means is switched with the spare storage means, the control means notifies external devices of the trouble in the first storage means. This enables automatic notification to the administrator and quick addressing if repair or replacement is necessary.

According to the present invention, even if the first storage means is unavailable because of a trouble in it, the available spare storage means can be substituted and data can be processed successfully. Therefore, in spite of a trouble in the first storage means, the data processing apparatus can continue operating so that high reliability is achieved.

DETAILED DESCRIPTION OF THE PREFERRED EMBODIMENTS

Figure 1:
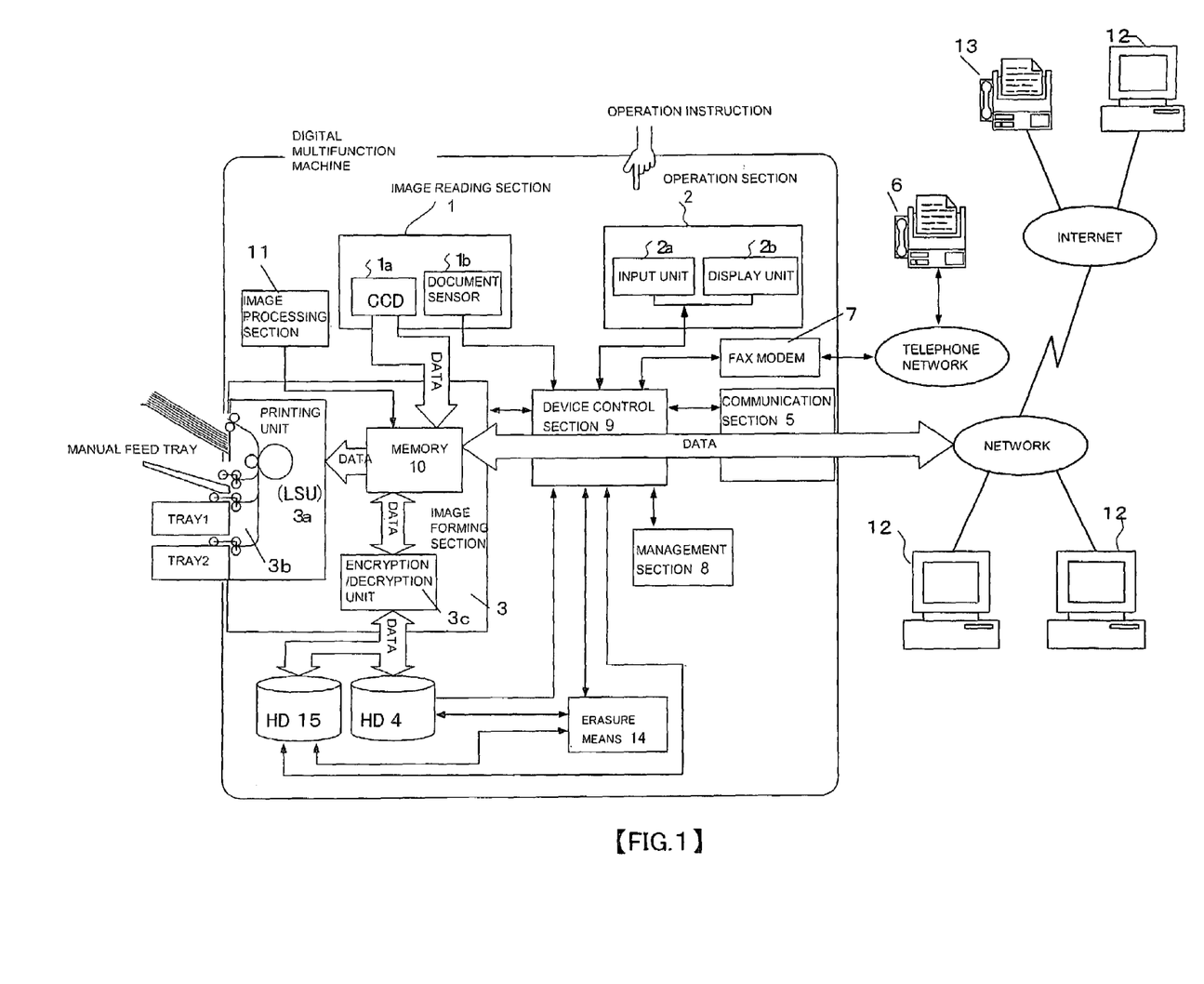
FIG. 1 is a diagram showing a schematic configuration of a digital multifunction machine, which is an embodiment of a data processing apparatus of the present invention.

FIG. 1 shows a data processing apparatus in an embodiment of the present invention. The data processing apparatus is a digital multifunction machine having copy mode, printer mode, scanner mode, and facsimile mode. The data processing apparatus includes: an image reading section 1 that reads a document and inputs image data; an operation section 2 that receives user inputs; an image forming section 3 that prints input image data; a hard disk device 4 that saves image data; a communication section 5 that communicates data with an external apparatus; a fax modem 7 for communicating with a facsimile machine 6; a management section 8 that stores information such as control information and setting information about the entire apparatus; and a device control section 9 responsible for controlling the entire apparatus.

The image reading section 1 functions as data input means for inputting image data and includes an imaging device such as a CCD 1a, and a document sensor 1b that senses a document placed on a document platform or on an automatic document feeder (ADF). The image data read by the CCD 1a is output to the image forming section 3.

The operation section 2 includes an input unit 2a consisting of various input keys, and a display unit 2b such as a liquid crystal display. The operation section 2 allows operations for the entire apparatus and inputting of various settings, and displays the input content and the operational state of the entire apparatus.

The image forming section 3 has a local memory 10 for storing input image data, a printing unit 3a implemented as a laser scanning unit, and a paper feeding unit 3b. The local memory 10 is implemented using readable/writable semiconductor memory, such as SDRAM or flash memory. The local memory 10 stores image data by overwriting old image data with new image data. The printing unit 3a prints an image on a recording sheet that is fed from the paper feeding unit 3b based on the image data stored in the local memory 10.

In the image forming section 3, input image data is stored in the local memory 10. The image data is subjected to image processing such as compression, decompression, or modification by the image processing section 11 and stored in the local memory 10. The image data subjected to the image processing is output to the printing unit 3a, the hard disk device 4 or the device control section 9. That is, the image forming section 3 functions as data processing means.

The local memory 10 is divided into a region for storing input image data and a region for storing image data to be output. Instead of using one local memory 10 divided into two regions, two local memories 10 can be used for input and output, respectively.

The communication section 5 is connected to a router, switching hub or the like via a LAN cable, and further connected to a network formed by information processing apparatus 12 such as personal computers and servers. The network is connected to the Internet via a telephone network or via a communication line such as a fiber-optic line. The communication section 5 transmits and receives data to and from the information processing apparatus 12 in the network, and data or e-mails to and from external information processing apparatus 12 and facsimile machine 13 over the Internet. The fax modem 7 is connected to a telephone network via a telephone line and performs facsimile communication with the external facsimile machine 6. Thus, since image data is input via the communication section 5 and the fax modem 7, they also function as data input means.

In response to an input from the operation section 2 or a data input from an external apparatus, the device control section 9 controls relevant components based on information stored in the management section 8 and processes input data. That is, the input image data is processed in either of copy mode, printer mode, scanner mode, or facsimile mode and is output in a desired form.

The hard disk device 4 is storage means for temporarily saving image data. When image data is saved in the hard disk device 4 by an encryption/decryption unit 3c, the image data is encrypted. When the image data is read from the hard disk device 4, the image data is decrypted.

Figure 2:
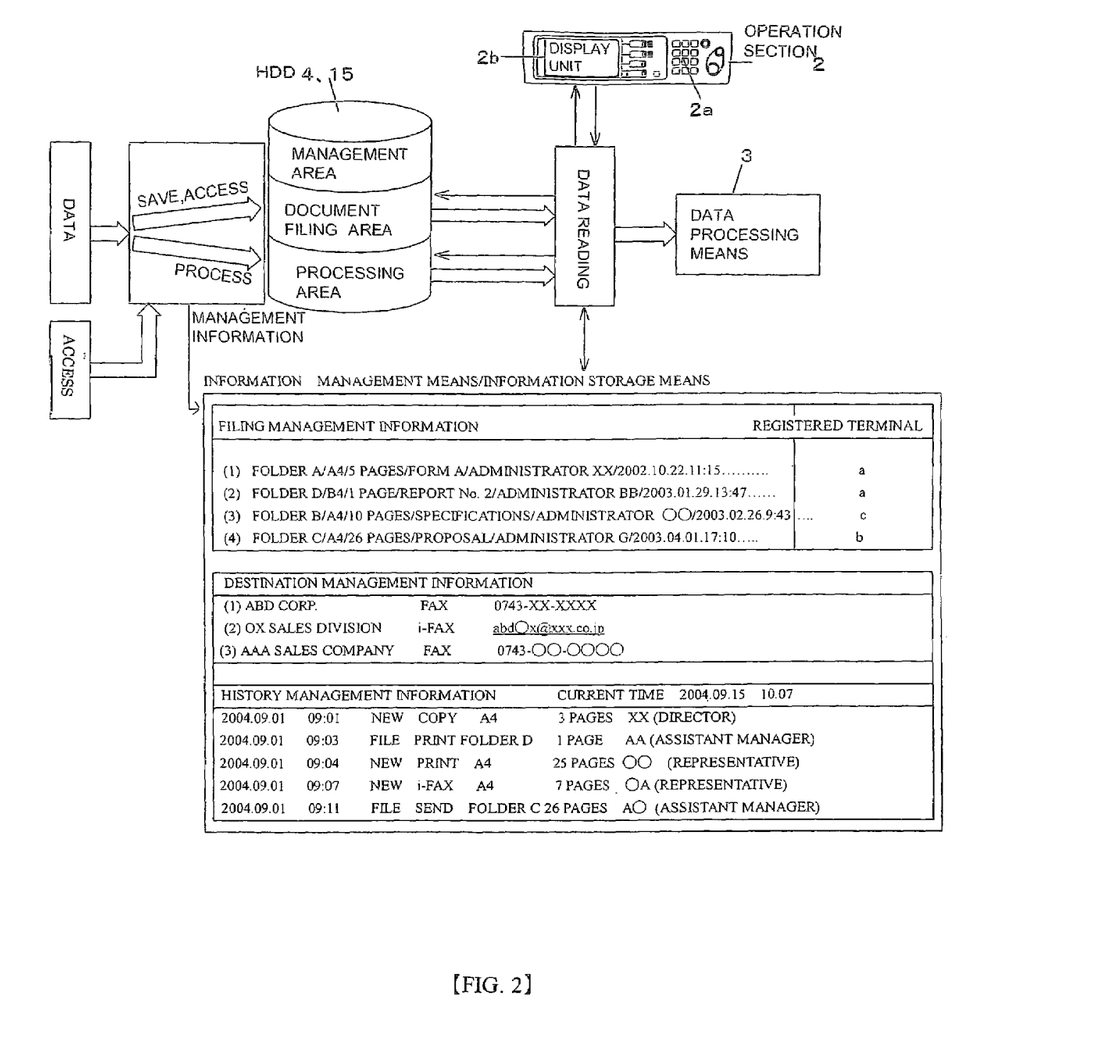
FIG. 2 is a diagram showing data flow into a hard disk device.

The hard disk device 4 also stores data other than image data, for example, management information for data processing. As shown in FIG. 2, in the hard disk device 4, a storage region is divided into a management area for storing management information, a document filing area for storing image data to be processed, and a processing area that temporarily stores image data for data processing. The management information includes filing management information, destination management information and history management information. The filing management information is a list of files for saving input image data. The destination management information is a list of destinations in facsimile communication. The history management information is a list of contents of executed processing.

The data processing apparatus further includes erasure means 14 for erasing image data in the hard disk device 4. The image data to be erased is the data stored in the processing area. The device control section 9 processes and outputs image data, and then controls operation of the erasure means 14. The erasure means 14 makes the stored image data unreadable by overwriting random data or meaningless data or by erasing data to invalidate the original image such that the original image cannot be restored. The erasure means 14 may also invalidate the image data by overwriting old image data to erase it or erasing image data in the local memory 10. However, management information stored in the hard disk device 4 is not erased unless the device control section 9 instructs to do so.

Now, operations in each mode will be described. In copy mode, image data of a document that is read by the image reading section 1 is output as a copy from the image forming section 3. Specifically, an image of a document placed at a reading position is read by the CCD 1a. The image data that is output from the CCD 1a is made up into an outputting image in the local memory 10 and sent to the hard disk device 4 to be temporarily saved there. For a plurality of documents, this reading and storage operation is repeated.

Then, based on processing indications provided from the operation section 2, the image data saved in the hard disk device 4 is sequentially read in a timely manner and sent to the local memory 10. Timed to writing operations to the printing unit 3a, the image data is transferred from the local memory 10 to the printing unit 3a, and the image is printed on a recording sheet.

Similarly, if a plurality of copies of the read image data are printed, the image data is saved on a page basis in the hard disk device 4 as outputting images and sent from the hard disk device 4 to the local memory 10 according to the output mode. Timed to writing operations to the printing unit 3a, the image data in the local memory 10 is repeatedly transferred to the printing unit 3a as many times as the number of copies to be output.

In printer mode, image data that is output from the information processing apparatus 12 is output from the image forming section 3. That is, the image data from the information processing apparatus 12 is received by the communication section 5. The device control section 9 sends the input image data to the local memory 10, decompresses the image data on a page basis as outputting image data, and temporarily saves the image data in the hard disk device 4. The image data is sent from the hard disk device 4 to the local memory 10, and transferred to the printing unit 3a as in the case of copy mode, and the image is printed.

In scanner mode, image data of a document that is read in the image reading section 1 is communicated to any of the information processing apparatus 12 over the network. That is, the image data that is output from the CCD 1a is made up into an outputting image in the local memory 10 and temporarily saved in the hard disk device 4. The image data is sent from the hard disk device 4 to the local memory 10. The device control section 9 establishes communication with a recipient in the network specified via the operation section 2 and transmits the image data from the communication section 5 to the destination. The image data may also be transmitted to the external information processing apparatus 12 or the facsimile machine 13 from the communication section 5 over the network and the Internet. By similar operations, in facsimile mode, the device control section 9 transmits image data from the fax modem 7 to the facsimile machine 6 via the telephone line.

In the processing of the image data that has been input from the data input means as described above, the image data is temporarily stored in the local memory 10. When the image data is processed and output completely, the erasure means 14 erases the image data from the hard disk device 4.

The present data processing apparatus includes a spare hard disk device 15 in addition to the above hard disk device 4. The former is referred to as a spare hard disk device (HD2) 15 and the latter is referred to as a first hard disk device (HD1) 4 herein. The spare hard disk device 15 complies with the same specifications as the first hard disk device 4. The spare hard disk device 15, being driven and controlled by the device control section 9 as with the first hard disk device 4, is constantly available.

The device control section 9 assembles management information and stores it in the first hard disk device 4 each time it processes and outputs image data. This management information is also stored in the spare hard disk device 15 in a timely manner as previously determined. For example, the management information is regularly stored in the spare hard disk device 15. Alternatively, when rewriting such as adding or modifying management information in the first hard disk device 4, the latest management information is simultaneously stored in the spare hard disk device 15.

Figure 3:
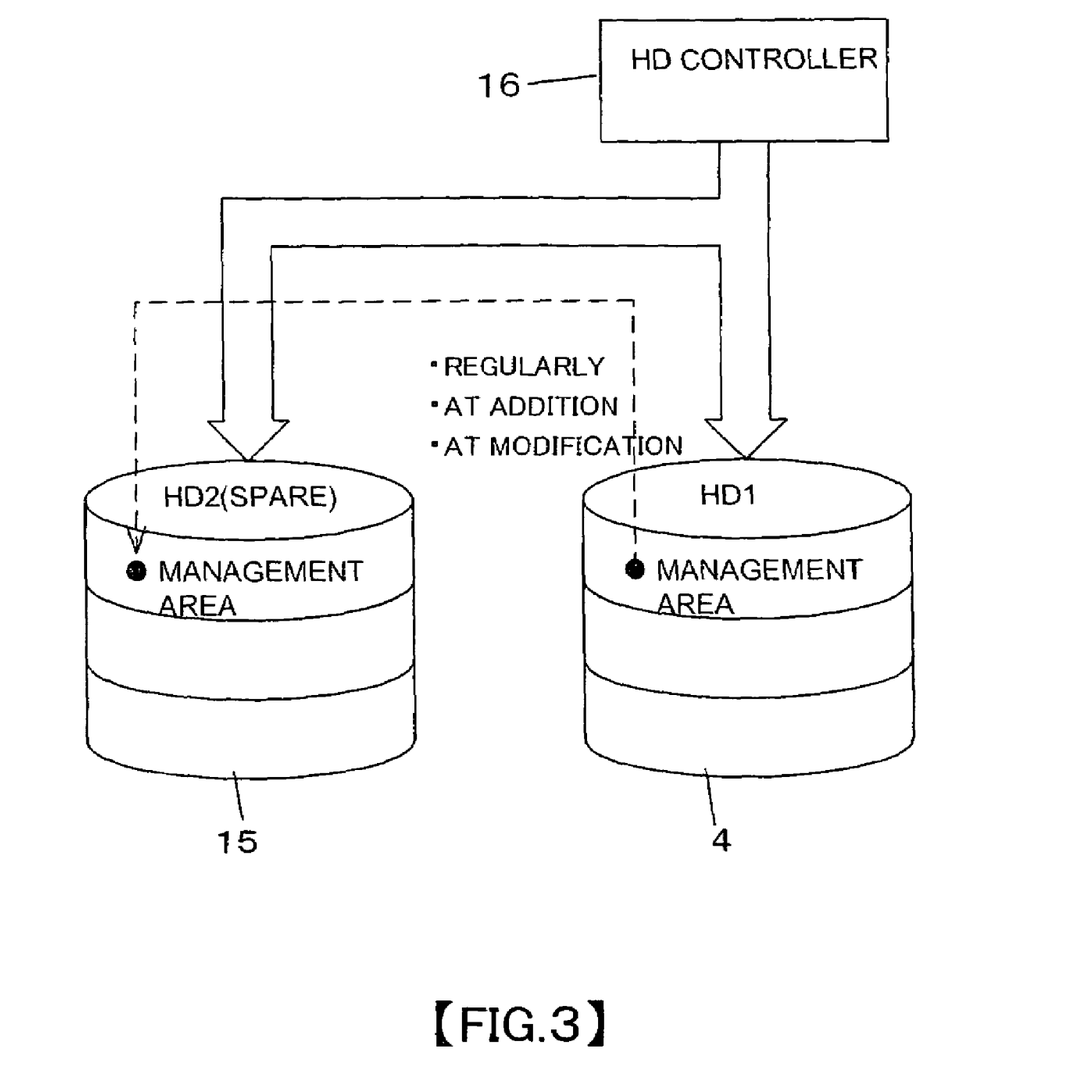
FIG. 3 is a diagram showing a first hard disk device and a spare hard disk device.

The device control section 9 includes monitor means for monitoring a state of the first hard disk device 4. As shown in FIG. 3, the monitor means detects whether a trouble has been occurred in the first hard disk device 4 or not by means of a hard disk controller 16 for controlling the driving of each of the hard disk devices 4 and 15. The hard disk controller 16 reads/writes data from/to the hard disk devices 4 and 15. When a read/write error occurs, or the controller 16 cannot access the hard disk devices 4 and 15, it judges that a trouble has occurred. Additionally, the monitor means gets SMART (Self-Monitoring, Analysis and Reporting Technology) information from the first hard disk device 4 to judge a state of the first hard disk device 4. It also monitors a state of the spare hard disk device 15 in a similar way.

The device control section 9 switches between the first hard disk device 4 and the spare hard disk device 15 depending on a state of the first hard disk device 4 detected by the monitor means. If the first hard disk device 4 is in a normal state, the first hard disk device 4 is used. When a trouble occurs in the first hard disk device 4, the spare hard disk device 15 is used. In this way, one of the hard disk devices 4 and 15 is used at all times.

Furthermore, the device control section 9 includes validation means for checking operation of the hard disk device 4 or 15 to be switched to when switching from one hard disk device 4 or 15 to the other hard disk devices 4 or 15. The validation means looks data transfer rate or reads/writes test pattern image data to ensure that normal operation of the hard disk devices 4 and 15 is secured. As a result of the operation checking, if the operation can be secured, the device control section 9 switches to the hard disk device 4 or 15. Otherwise, it stops the operation because of an error of the data processing apparatus and informs the error.

Figure 4:
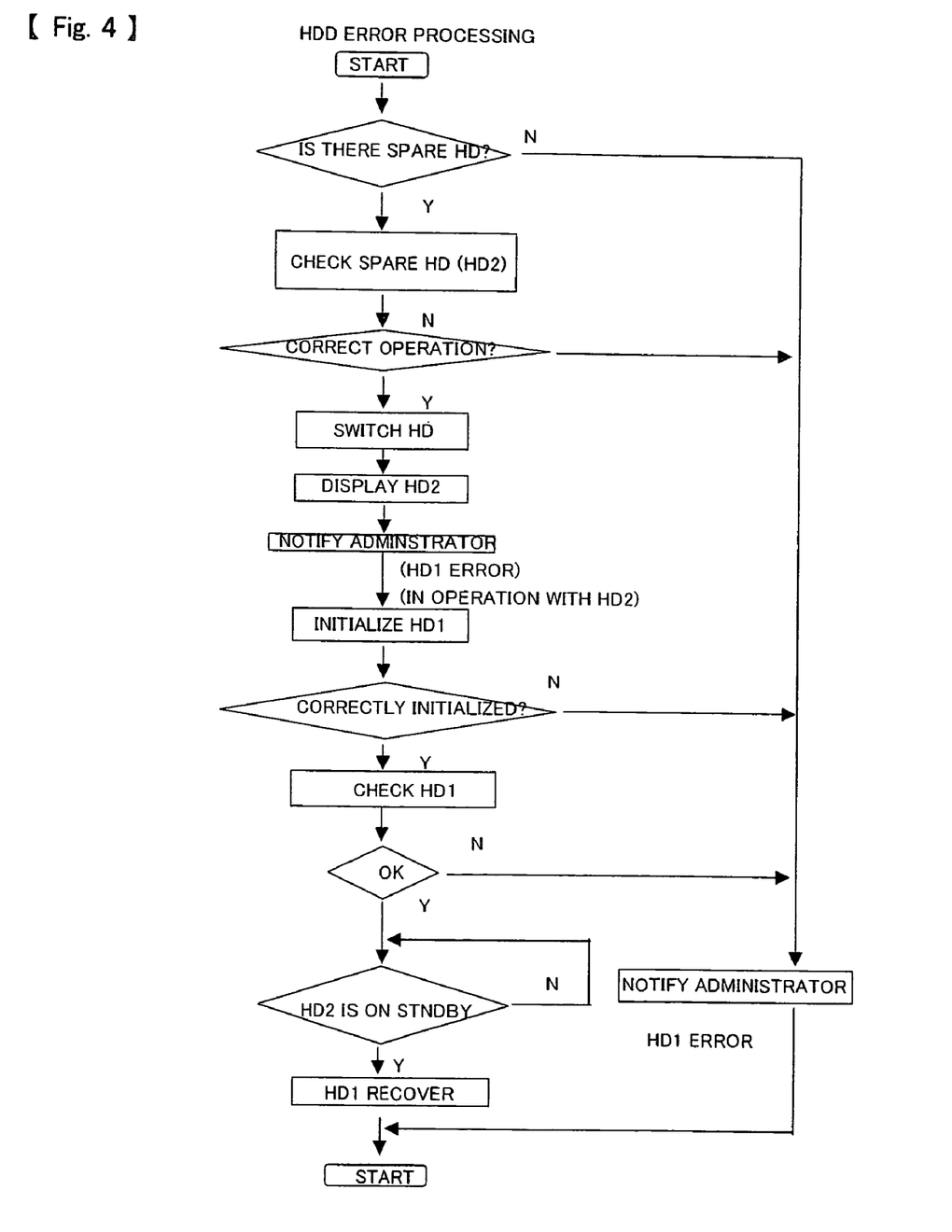
FIG. 4 is a flowchart of an error processing operation when a trouble occurs in the first hard disk device.

Next, an error processing operation when a trouble occurs in the first hard disk device 4 is described with reference to FIG. 4. The data processing apparatus uses the first hard disk device 4 in a normal condition. At this time, the spare hard disk device 15 is driven and on standby in an available state. When a trouble occurs in the first hard disk device 4 in this state, the monitor means detects the trouble. First, the device control section 9 recognizes that the spare hard disk device 15 is on standby. This recognition can be made by referring to information from the hard disk controller 16. If the spare hard disk device 15 is unavailable, the device control section 9 displays an error on the display unit and stops operation in specified mode. Then, it notifies an administrator's external device, through the communication section 5, that an error has occurred.

If the spare hard disk device 15 is on standby in an available state, the operation of the spare hard disk device 15 is checked. If the operation can be secured, the first hard disk device 4 is switched to the spare hard disk device 15. If the operation of the spare hard disk device 15 cannot be secured, in a similar way as above, the error is displayed, the operation is stopped and the error is notified.

Figure 5:
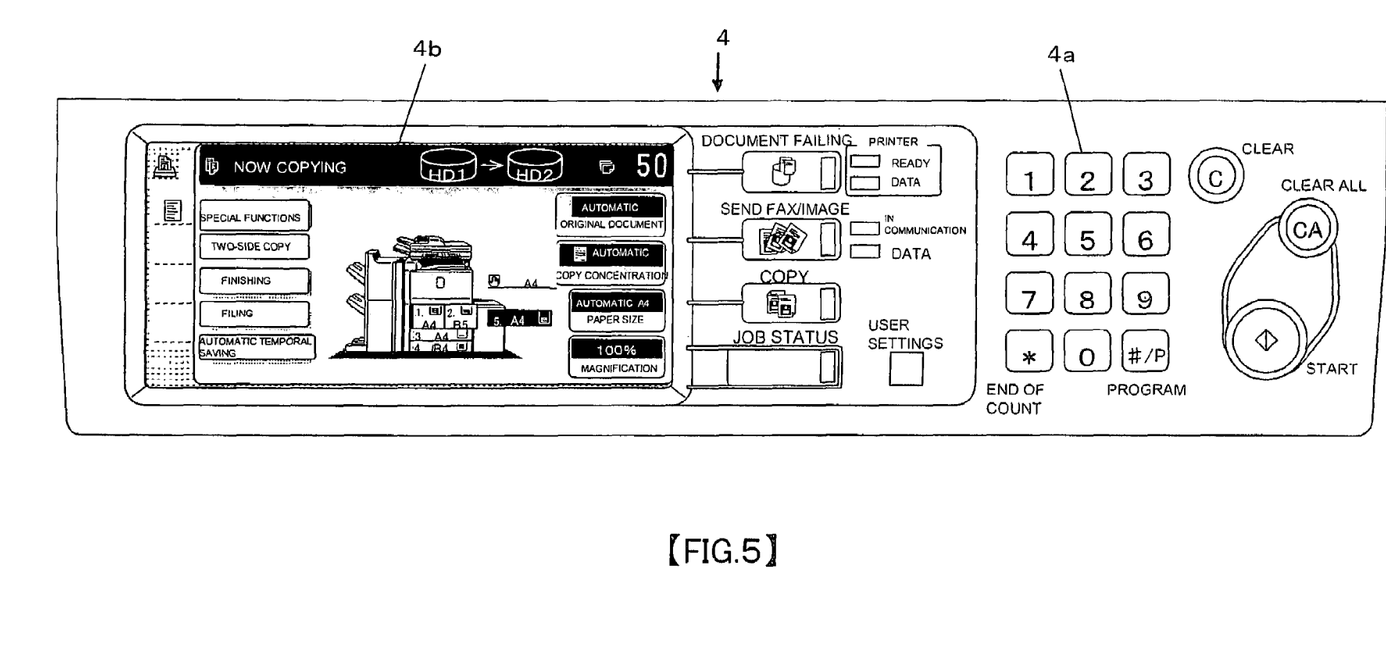
FIG. 5 is a diagram showing a display unit when the first hard disk device is switched with the spare hard disk device.

When the switching to the spare hard disk device 15 is performed, as shown in FIG. 5, the device control section 9 displays that the hard disk device 4 is switched to the spare device and the spare device is operating. Through this display, a user knows that a trouble has occurred in the first hard disk device 4. The device control section 9 also notifies external devices, through the communication section 5, that an error has been occurred.

After the switching, image data to be input and processed is stored in the spare hard disk device 15. The management information has been already stored in the spare hard disk device 15. If the management information has been rewritten, the latest management information would be stored in the spare hard disk device 15.

While the spare hard disk device 15 is in use, the device control section 9 initializes the first hard disk device 4. When this initialization completes, the operation of the first hard disk device 4 is checked. If the first hard disk device 4 cannot be initialized, or if the initialization has completed but the operation of the first hard disk device 4 cannot be secured, the device control section 9 notifies external devices, through the communication section 5, that an error has occurred. The spare hard disk device 15 is used until the first hard disk device 4 becomes available by repair or replacement.

If the operation of the first hard disk device 4 can be secured by the initialization, the device control section 9 switches from the spare hard disk device 15 to the first hard disk device 4. At this time, if the spare hard disk device 15 is in operation, the section 9 waits until the operation ends. When the spare hard disk device 15 is on standby, switching to the first hard disk device 4 is performed.

After the device control section 9 switches to the first hard disk device 4, it copies the latest management information stored in the spare hard disk device 15 to the first hard disk device 4. If image data is stored in the spare hard disk device 15, this image data is also copied. This makes it possible to read necessary information at all times when processing and outputting image data whichever hard disk device 4 or 15 is used, thereby preventing the processing from being infeasible.

As described above, even in an emergency in which a trouble occurs in the first hard disk device 4, switching to the spare hard disk device 15 can be performed immediately. Through display or notification of the error, an administrator knows that the first hard disk device 4 needs to be repaired or replaced. The spare hard disk device 15 is used to process image data successfully until the administrator comes for repair or replacement. Therefore, the data processing apparatus is never unusable due to a trouble in the hard disk devices 4 and 15, thereby preventing any inconvenience for a user.

It is to be understood that the present invention is not limited to the above-described embodiments, but many modifications and alterations may be made to the embodiments within the scope of the present invention. The data processing apparatus may be a multifunction machine with copy mode and facsimile mode, as well as a dedicated machine with single mode, such as a copier, a printer, or a facsimile machine. The storage means is not limited to the hard disk device but may be implemented using a recording medium removable from the apparatus, such as nonvolatile memory, an optical disk, a magnetic disk, or a magneto-optical disk. The spare storage means may be divided into a plurality of storage means. When one of the spare storage means is unavailable, other spare storage means can be used.

Image data can be stored not only in the first storage means, but also in the spare storage means. When a trouble occurs in the first storage means during the processing of image data, switching from the first storage means to the spare storage means is performed. At this time, since the same image data has been stored in the spare storage means, the processing can be continued as ever.

What is claimed is:

1. A data processing apparatus comprising:
input means for inputting data;
processing means for processing and outputting the input data;
first storage means for temporarily storing data to process and output the input data;
spare storage means in such a state of being available for storing the data; and
control means for controlling each means to process the input data;
wherein the control means includes monitor means for monitoring the state of the first storage means and validation means for checking the operation of each storage means by operating each storage means, and
wherein the control means, when switching data storage location to the spare storage means depending on the state of the first storage means, performs switching after determining the normal operation of the spare storage means using the validation means.

2. A data processing apparatus comprising:
input means for inputting data;
processing means for processing and outputting the input data;
a plurality of storage means for temporarily storing data to process and output the input data; and
control means for controlling each means to process the input data;
wherein a first storage means of the plurality of storage means is used in a normal condition while other storage means is spare storage means in a constantly available state,
wherein the control means includes validation means for checking the operation of each storage means by operating each storage means and
wherein the control means switches a data storage location from the first storage means to the spare storage means after determining the normal operation of the spare storage means using the validation means.

3. The data processing apparatus according to claim 1 or 2, wherein the control means switches to the spare storage means when the control means detects the trouble in the first storage means.

4. The data processing apparatus according to claim 3, wherein the control means switches from the spare storage means to the first storage means when the first storage means becomes available.

5. The data processing means according to claim 1 or 2, wherein the control means checks, before switching, to see whether the available spare storage means is present.

6. The data processing means according to claim 4, wherein the control means performs the operation checking the first storage means by the validation means before switching a data storage location from the first storage means to the spare storage means.

7. The data processing apparatus according to claim 1 or 2, wherein the control means initializes the first storage means when the first storage means is switched with the spare storage means.

8. The data processing apparatus according to claim 7, wherein the control means switches from the spare storage means to the first storage means after initializing the first storage means.

9. The data processing apparatus according to claim 1 or 2, wherein the first storage means stores data to be processed and output and management information for the data processing, the management information being stored also in the spare storage means.

10. The data processing apparatus according to claim 9, wherein the control means causes the spare storage means to store the management information in a timely manner as previously determined while the first storage means is in use.

11. The data processing apparatus according to claim 9, wherein the control means causes the spare storage means to store the latest management information when overwriting the management information for the first storage means while the first storage means is in use.

12. The data processing apparatus according to claim 9, wherein the control means causes the spare storage means to store data and management information when the first storage means is switched with the spare storage means.

13. The data processing apparatus according to claim 12, wherein the control means copies the management information stored in the spare storage means to the first storage means when returning data storage location from the spare storage means to the first storage means.

14. The data processing apparatus according to claim 1 or 2, wherein the control means informs that the first storage means has been switched with the spare storage means and the spare storage means is in use.

15. The data processing apparatus according to claim 1 or 2, wherein the control means notifies external devices of the trouble in the first storage means when the first storage means is switched with the spare storage means.

* * * * *